June 27, 1961
H. W. CLARKE ET AL
2,990,287
APPARATUS FOR STORING AND SERVING FOODS
Filed June 6, 1957
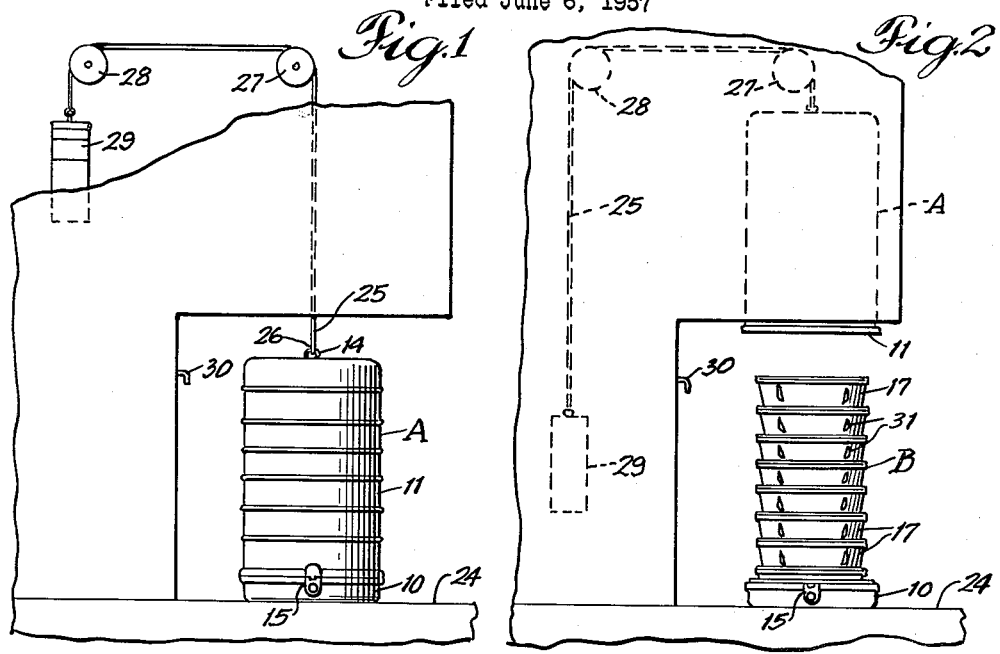
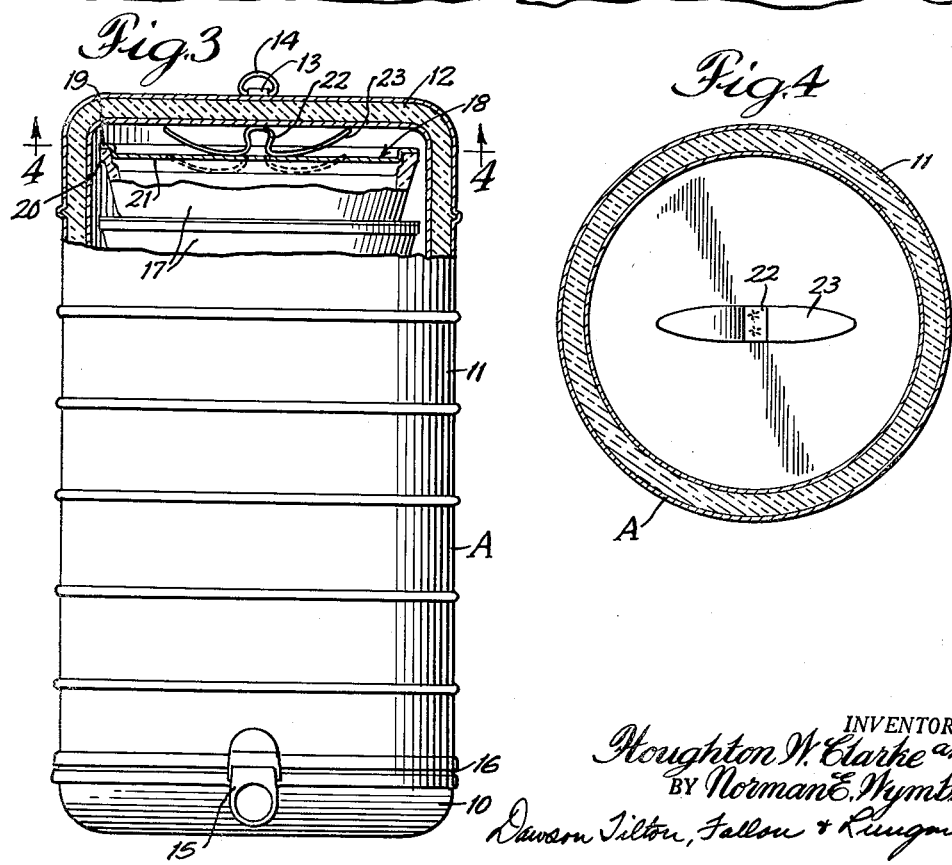
INVENTORS:
Houghton W. Clarke and
BY Norman E. Wymbs,
Dawson Tilton, Fallon & Lungmus,
ATTORNEYS.

United States Patent Office 2,990,287
Patented June 27, 1961

2,990,287
APPARATUS FOR STORING AND SERVING FOODS
Houghton W. Clarke and Norman E. Wymbs, Evanston, Ill., assignors to Mealpack Corporation, Evanston, Ill., a corporation of Illinois
Filed June 6, 1957, Ser. No. 664,117
3 Claims. (Cl. 99—174)

This invention relates to apparatus for storing and serving foods. The invention is particularly useful in the storing of prepared hot foods, as well as cold foods, and for permitting the food containers to be stored in a compact and insulated arrangement.

An object of the invention is to provide apparatus in which food may be conveniently stored in a plurality of receptacles and maintained therein in sealed and insulated condition while at the same time permitting the separate receptacles to be separated as desired and served to individuals. A further object is to provide storage and serving apparatus in which a plurality of dishes or containers are securely held during the shipment while at the same time enabling the separate containers to be removed one at a time during a serving preiod. A still further object is to provide, with such a structure, means for automatically housing a series of stacked and sealed food-containing dishes, while permitting ready separation of the dishes and enclosure therein again. Other specific objects and advantages will appear as the specification proceeds.

The invention is shown, in an illustrative embodiment, by the accompanying drawing, in which—

FIGURE 1 is a broken side elevational view of apparatus embodying our invention; FIG. 2, a view similar to FIG. 1 but showing the upper section of the container raised to expose the dishes therebelow; FIG. 3, an enlarged broken side view in elevation of the container structure shown in FIG. 1; and FIG. 4, a detail sectional view, the section being taken as indicated at line 4—4 of FIG. 3.

In the illustration given, A designates a sectional container adapted to receive a plurality of stacked dishes, which are indicated generally by the letter B.

The sectional container A comprises a lower section 10 and an upper section 11. Each of the sections may be formed of metal, plastic, or other suitable material, and may be provided with insulation 12 between inner and outer liners. The upper section 11 is provided with a bracket 13 receiving a ring 14 which may serve as a handle and also as a means for receiving a counterbalance hook, which will be later described. The container sections 10 and 11 are provided on opposite sides thereof with clamps or latching means 15 for drawing the sections 10 and 11 toward each other. Between the sections 10 and 11 is a resilient sealing gasket ring 16 which is adapted to be compressed when the container sections are drawn toward each other. A detailed description of the clamping means 15 is set out in Clarke Patent 2,656,946. It will be understood that any suitable clamping means for drawing together the two container sections 10 and 11 may be employed.

Within the bottom container section 10 is a dish 17 and extending there-above a plurality of dishes 17 forming the stack B. The dishes 17 may be stacked upon each other in sealing relation, the uppermost container 17 being provided with a lid 18. We prefer to equip each of the dishes 17 with a sealing lid 18, the lid having an outer flange 19 resting upon the top rim 20 of the dish and having a central dished or depressed portion 21. When lids are used with all of the dishes 17, each of the lids below the topmost dish will receive within its central recessed portion 21 the bottom of the dish above. As shown most clearly in FIGURE 3, the internal diameter of the container is sufficiently greater than the diameter of the stack of dishes and lids so as to provide annular spacing about the stack, the spacing facilitating the enclosing of the stack within the container in the manner set forth hereinafter.

The lid 18 of the uppermost dish 17 is held in sealing relation with the upper rim 20 of the dish by a spring 22 having outwardly-extending spring fingers 23. The spring 22 may be freely interposed between the lid 18 and the top of the upper section, or, if desired, the central portion of the spring 22 may be welded or otherwise secured to the top of the upper section 11 or to the lid 18 therebelow. In any position, the spring serves, when compressed, to urge the lid 18 into sealing relation with the dish 17 thereof and to urge also the lids of the dishes therebelow into sealing engagement with the dishes. Referring to FIGURE 3, it will be observed that the central depressed portion 21 of the uppermost lid is flat and smooth and therefore, while spring 22 effectively clamps all of the lids and dishes together to form a unitary stack, the spring cannot prevent limited lateral movement of the uppermost lid in response to forces of substantial magnitude tending to shift or tip the entire stack within the container. Effective compression of the spring 22 is brought about by the clamping draw members 15 which draw the upper section 11 downwardly against the lower section, compressing the sealing gasket 16 while at the same time compressing spring 22.

While we prefer to provide insulated sections 10 and 11, it will be understood that such sections may be provided, if desired, with electric resistance elements for heating the space or an insulating effect may be provided by any other suitable means or material.

The container A, after being filled with dishes containing foods and after being effectively sealed by the drawing of the sections tightly together through the use of the clamping members 15, may be brought to the serving area as, for example, a table 24 or shelf within a recess, from which serving can be readily made. For example, in a railway car or other vehicle, the container A may be placed in a position as shown for ready access. To counterbalance the upper section 11, a chain or flexible element 25 may be equipped with a hook 26 engaging the ring 14 of the section 11 and the filament may be extended over pulleys 27 and 28 and equipped at its other end with a counterweight 29. We prefer to have the counterweight 29 heavy enough to just about balance the weight of section 11 so that the section can be raised, as illustrated in FIG. 2, and then, when released, the section will slowly return to its position enclosing the stack B therebelow. The side wall may be equipped with a hook 30 for receiving the filament hook 26 when the container A is not in use.

Operation

In the operation of the apparatus, the dishes 17, which may be provided with partitions containing several different kinds of food, are preferably each equipped with lids 18 and the dishes stacked, as shown best in FIGS. 2 and 3. The upper sleeve cover or section 11 may then be placed in enclosing position about the remainder of the stack B and the clamps 15 drawn to bring the upper section 11 into compressive relation with the spring 22 while at the same time effecting a seal between the sections through the compressing of the resilient gasket 16. The filled container A may then be shipped to the desired destination, the dishes therein being securely held by the spring pressure above referred to, and the container may be placed upon the shelf or table 24 until time to serve the food.

When it is desired to serve the food, the hook 26 may be secured to the ring 14 of container section 11 and the section may be lifted, as illustrated in FIG. 2, so that a top dish or several dishes, may be removed. As the operator carries the dishes to passengers or to others in the area, section 11 settles slowly into position about the remaining containers and prevents loss of heat therefrom. With this structure, there is an automatic closing of the dish stack as upper dishes are removed, while at the same time ready access to the dishes is made possible by simply exerting a slight lifting pressure against the section 11.

In the serving of the dishes 17, the dishes are usually placed within individual trays having openings or depressions therein, and for this purpose the dishes 17 may be provided with a plurality of knobs 31 adapted to engage recesses in the tray (not shown) for the anchoring of the dishes therein. After the food has been eaten and the dishes are returned, the same may be stacked in the manner shown in FIG. 2 and the dishes again secured in frictionally held position by the use of the clamping draw members 15 and the compressible spring 22.

In the serving of hot foods, it is found that the kitchen freshness of the foods is preserved by placing the stack of dishes filled with food in the position shown in FIG. 2 so that vapors from the foods tend to fill the area above the foods and about the dishes. After the clamping of the sections together in sealing relation, the condensing of the water vapor produces a vacuum within the container, further increasing the insulating value of the container and the tightness of the lid seal of each container. At the same time, by simply releasing the latch members 15 and raising the sleeve cover 11, it is found that the several dishes can be served readily to passengers or others by lifting the lid from each dish as the same is served.

It will be understood that any suitable counterbalance means may be employed. A spring counterbalance may be used, but we prefer the weight balance, as illustrated in FIGS. 1 and 2.

The section 11 may, if desired, be lighter than the counterbalance 29, so that the section 11 will be normally maintained in a raised position, as illustrated in FIG. 2. When desired, the section 11 can be drawn down and secured in the lower position by latching the elements 15. We have found it advantageous, however, to have the section 11 slightly heavier than the weight 29, for the purposes already described, and particularly for the purpose of slowly enclosing the dishes after the server removes the uppermost dishes and is serving them to passengers, etc.

The spring which is interposed between the top of the container and the lid of the uppermost dish may, as stated before, be a part of the lid of the dish or be a part of the top or lid of the container. In other words, a spring may be secured to the dish lid or top dish in the stack or to the container top. The container may be provided with insulating walls which retain heat effectively without the addition of electric resistance elements, but, if desired, both insulated walls and electric resistance elements may be employed to heat the space about the dishes. A unique advantage of the structure is that each dish may be employed for containing an individual meal so that upon the opening of the large containers, the separate dishes each containing a complete individual meal may be served.

In the operation of the structure shown, there is a self-forming vacuum seal, and this prevents intermingling of the aromas or flavors of the foods to change the individual taste of the foods so stored.

While, in the foregoing specification, we have set forth a specific means or method in detail for the purpose of illustrating an embodiment of the invention, it will be understood that such details of procedure or apparatus may be varied widely by those skilled in the art without departing from the spirit of our invention.

We claim:

1. In an apparatus for the storing of prepared meals, a plurality of identical food dishes each containing a prepared and ready-to-serve individual meal and each being provided with a metal lid having an outer flange resting upon the rim of the dish therebelow and having a flat upper surface bordered by said flange, said dishes being stacked upon each other with the under surface of each dish resting upon the flat upper surface of the lid directly therebelow, an insulated container having horizontal internal dimensions greater than the diameter of the stack of said dishes and lids to provide annular spacing about said stack and comprising a base section receiving the lowermost dish of said stack and an open-bottomed upper section cooperating with said lower section to enclose said stack, and a spring being secured to the under surface of said upper section adjacent the top thereof and having a base portion and at least a pair of outwardly extending spring fingers, said spring fingers bearing downwardly against the flat upper surface of the lid of the uppermost dish of said stack and slidably engaging said upper surface to permit limited lateral movement of said dishes within the interior of said container.

2. In an apparatus for the storing of prepared meals, a plurality of identical food dishes each containing a prepared meal and each being provided with a lid formed of a hard deformation-resisting material, each of said lids having an outer flange resting upon the rim of the dish therebelow and having a flat upper surface bordered by said flange, said dishes being stacked upon each other with the under surface of each dish resting upon the flat upper surface of the lid directly therebelow, an insulated container having horizontal inside dimensions greater than the diameter of the stack of dishes to provide annular spacing about said stack and comprising a base section receiving the lowermost dish of said stack and an open-bottomed upper section cooperating with said lower section to enclose said stack, a compression spring secured within said upper section to the top thereof and adapted to bear downwardly against the flat upper surface of the lid of the uppermost dish of said stack when said sections are clamped together, said spring slidably engaging the upper surface of the lid of the uppermost dish when said sections are clamped together to permit limited lateral movement of said dishes within the interior of said container, and clamping means for drawing and clamping said sections together to compress said spring, whereby, said spring operates to maintain said dishes and lids in sealing engagement despite limited lateral displacement of the dishes of said stack during movement of said container.

3. The structure of claim 2 in which said spring is provided with a central base portion fixed to the upper section of said container and a pair of downwardly and outwardly extending spring fingers bearing against the lid of the uppermost dish at spaced points upon the flat upper surface thereof.

References Cited in the file of this patent

UNITED STATES PATENTS

| | | |
|---|---|---|
| 296,043 | Neumuller et al. | Apr. 1, 1884 |
| 1,324,653 | Ferdon | Dec. 9, 1919 |
| 1,669,183 | Wilson | May 8, 1928 |
| 1,683,571 | Mueller | Sept. 4, 1928 |
| 2,184,336 | Devine | Dec. 26, 1939 |
| 2,347,670 | Devine | May 2, 1944 |
| 2,405,764 | Smith | Aug. 13, 1946 |